UNITED STATES PATENT OFFICE.

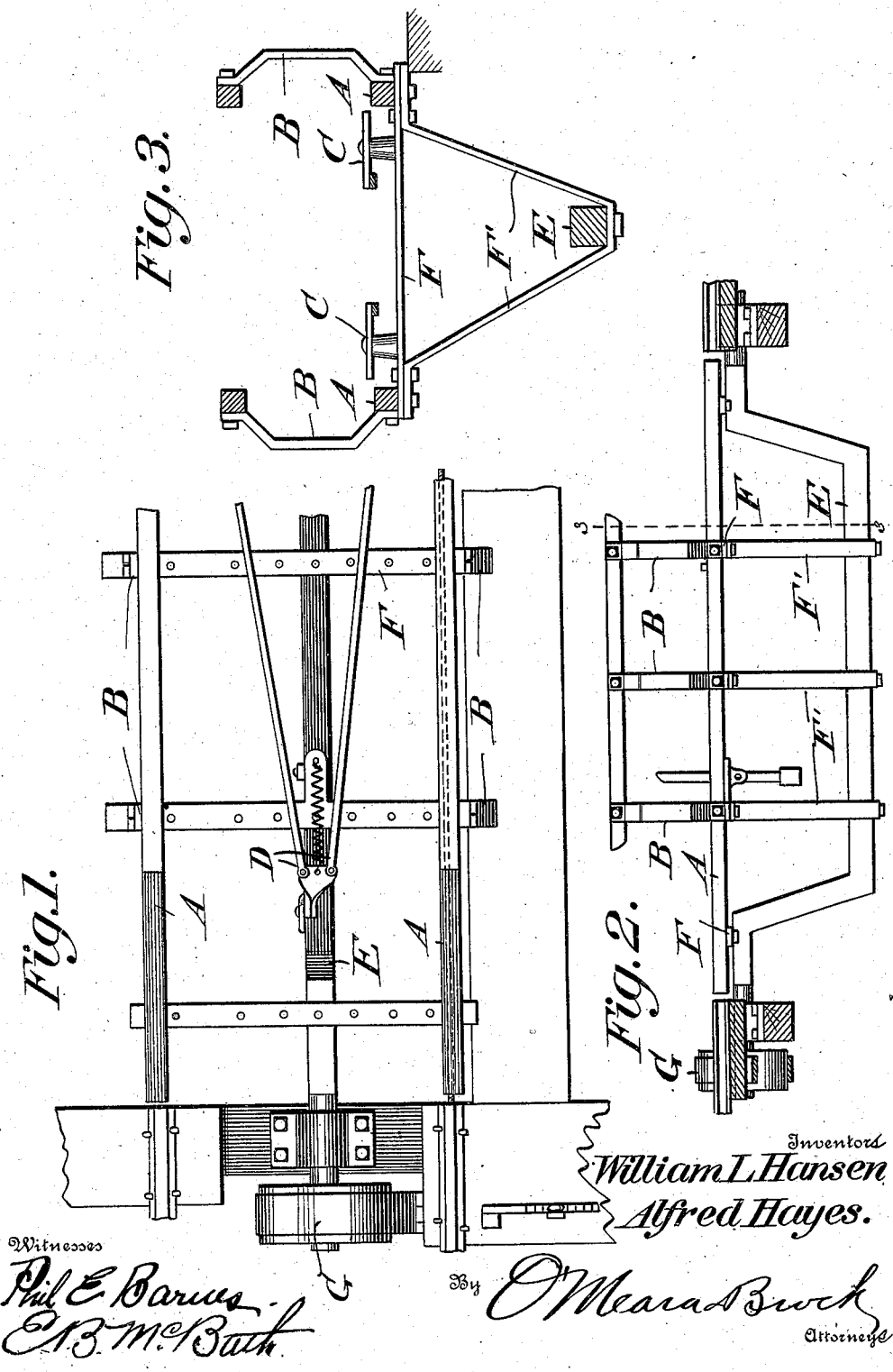

WILLIAM L. HANSEN AND ALFRED HAYES, OF COALVILLE, UTAH.

DROP-AXLE FOR TILTING PLATFORMS.

No. 881,316.

Specification of Letters Patent.

Patented March 10, 1908.

Application filed March 23, 1907. Serial No. 364,119.

*To all whom it may concern:*

Be it known that we, WILLIAM L. HANSEN and ALFRED HAYES, citizens of the United States, residing at Coalville, in the county of Summit and State of Utah, have invented a new and useful Improvement in a Drop-Axle for Tilting Platforms, of which the following is a specification.

This invention is an improvement upon an automatic car dumping device for which we were granted Letters Patent No. 817,972, dated April 17, 1906.

In the device shown and described in the said patent a counter-balance weight was secured upon an axle which axle carried a tilting platform. We have simplified the construction by providing the platform with a drop axle which acts both as an axle for the platform and as a counter-weight, thus making it unnecessary to employ the weight shown in the above mentioned patent.

In the accompanying drawings, Figure 1 is a plan view of a portion of our tilting platform. Fig. 2 is a side elevation of the platform upon a reduced scale. Fig. 3 is a transverse section upon the line 3—3 of Fig. 2.

In these drawings A represents the platform or track section shown in the patent above referred to and provided with certain car holding and locking means B and C operated by certain mechanism shown upon the platform or track section D. All of this mechanism is fully described in the patent above referred to and does not form a part of the present improvement.

In our present construction we employ a drop axle E. The track section A is parallel to and above the drop portion of the axle being in a horizontal plane slightly above the plane of the pivotal points of the axle, so that the section of track A forms a continuation of the regular track. The axle E is slightly off-set with respect to the track being to one side of the longitudinal center of the track. The drop portion of the axle serves as a counter-balance weight doing away with the extra weight formerly used.

The track or platform section is also provided with suitable cross-ties F and with angled brackets F', which drop down and pass under the drop portion of the axle. Suitable operating mechanism G, comprising a pulley and belt is also mounted upon the axle and are also shown in the patent referred to.

The operation of the device is substantially the same as heretofore.

Having thus fully described our invention, what we claim as new and desire to secure by Letters Patent, is:—

1. A pivoted axle having a drop portion and a track section supported by said axle and in a horizontal plane above the pivotal point of the axle.

2. In a device of the kind described a track section an axle journaled at each end and supporting said track section, the axle being arranged upon one side of the longitudinal center of the track, and having intermediate its ends and beneath the track section a drop portion, said drop portion being spaced from the track forming a counter-balance weight as and for the purpose set forth.

WILLIAM L. HANSEN.
ALFRED HAYES.

Witnesses:
FRANK EVANS,
E. H. RHEAD.